(12) United States Patent
Schimmel

(10) Patent No.: US 10,458,135 B2
(45) Date of Patent: Oct. 29, 2019

(54) SUBMERGIBLE PUBLIC SANITARY DEVICE HAVING AT LEAST ONE CLOSABLE WALK-IN POSITION

(71) Applicant: URILIFT BEHEER B.V., Beemte-Broekland (NL)

(72) Inventor: Marten Alberto Schimmel, Beemte-Broekland (NL)

(73) Assignee: URILIFT BEHEER B.V., Beemte-Broekland (NL)

( * ) Notice: Subject to any disclaimer, the term of this patent is extended or adjusted under 35 U.S.C. 154(b) by 40 days.

(21) Appl. No.: 15/528,512

(22) PCT Filed: Nov. 19, 2015

(86) PCT No.: PCT/NL2015/050809
§ 371 (c)(1),
(2) Date: May 21, 2017

(87) PCT Pub. No.: WO2016/080833
PCT Pub. Date: May 26, 2016

(65) Prior Publication Data
US 2017/0268246 A1    Sep. 21, 2017

(30) Foreign Application Priority Data
Nov. 21, 2014 (NL) ..................... 2013846

(51) Int. Cl.
*E04H 1/12* (2006.01)
*E05D 15/48* (2006.01)
(Continued)

(52) U.S. Cl.
CPC .......... *E04H 1/1216* (2013.01); *E05D 15/48* (2013.01); *E06B 3/7009* (2013.01); *E06B 5/00* (2013.01);
(Continued)

(58) Field of Classification Search
CPC .......... E04H 1/1216; E05D 15/48; E06B 5/00
(Continued)

(56) References Cited

U.S. PATENT DOCUMENTS 4,598,433 A * 7/1986 Whitney ................. A47K 3/362
4/557
2014/0259971 A1* 9/2014 Bikker ..................... A47K 4/00
52/34

FOREIGN PATENT DOCUMENTS

CN            202248174           5/2012
DE             1927757 A1  * 10/1970  ............. E06B 3/921
(Continued)

OTHER PUBLICATIONS

Derwent English abstract of DE 1 927 757 A1 printed Aug. 24, 2018.*
(Continued)

*Primary Examiner* — Christine J Skubinna
(74) *Attorney, Agent, or Firm* — Bekiares Eliezer LLP

(57) ABSTRACT

The invention relates to a public sanitary device (1), comprising a housing with walk-in positions (20, 30), each with a receptacle (21, 31) for human excrement and/or urine. The housing is provided with a first housing part (11) intended for placing underground, a second housing part (12) received movably in the first housing part and a third housing part (13) received movably in the second housing part. The sanitary device comprises a drive for moving the second and third housing parts between an underground rest position and an above-ground position of use. At least one of the walk-in positions is provided with a door for closing the walk-in position. The door comprises at least a first and a second door segment (41, 42), which door segments are movable in longitudinal direction relative to each other. The second housing part (12) comprises the first door segment
(Continued)

(41) and the third housing part (13) comprises the second door segment (42).

19 Claims, 7 Drawing Sheets

(51) Int. Cl.
*E06B 3/70* (2006.01)
*E06B 5/00* (2006.01)
(52) U.S. Cl.
CPC ..... *E05Y 2201/684* (2013.01); *E05Y 2900/60* (2013.01); *E06B 2003/7049* (2013.01)
(58) Field of Classification Search
USPC .......................................................... 4/476
See application file for complete search history.

(56) References Cited

FOREIGN PATENT DOCUMENTS

| DE | 202005009772 | 10/2005 |
| EP | 1232313 | 8/2002 |
| WO | WO02/103138 | 12/2002 |
| WO | WO2008/089319 | 7/2008 |

OTHER PUBLICATIONS

Urilift BV; Urilady: Openbare verzinkbare toilet; http://urilift.nl/openbare-toilet/verzinkbaar-toilet-urilady.php.

\* cited by examiner

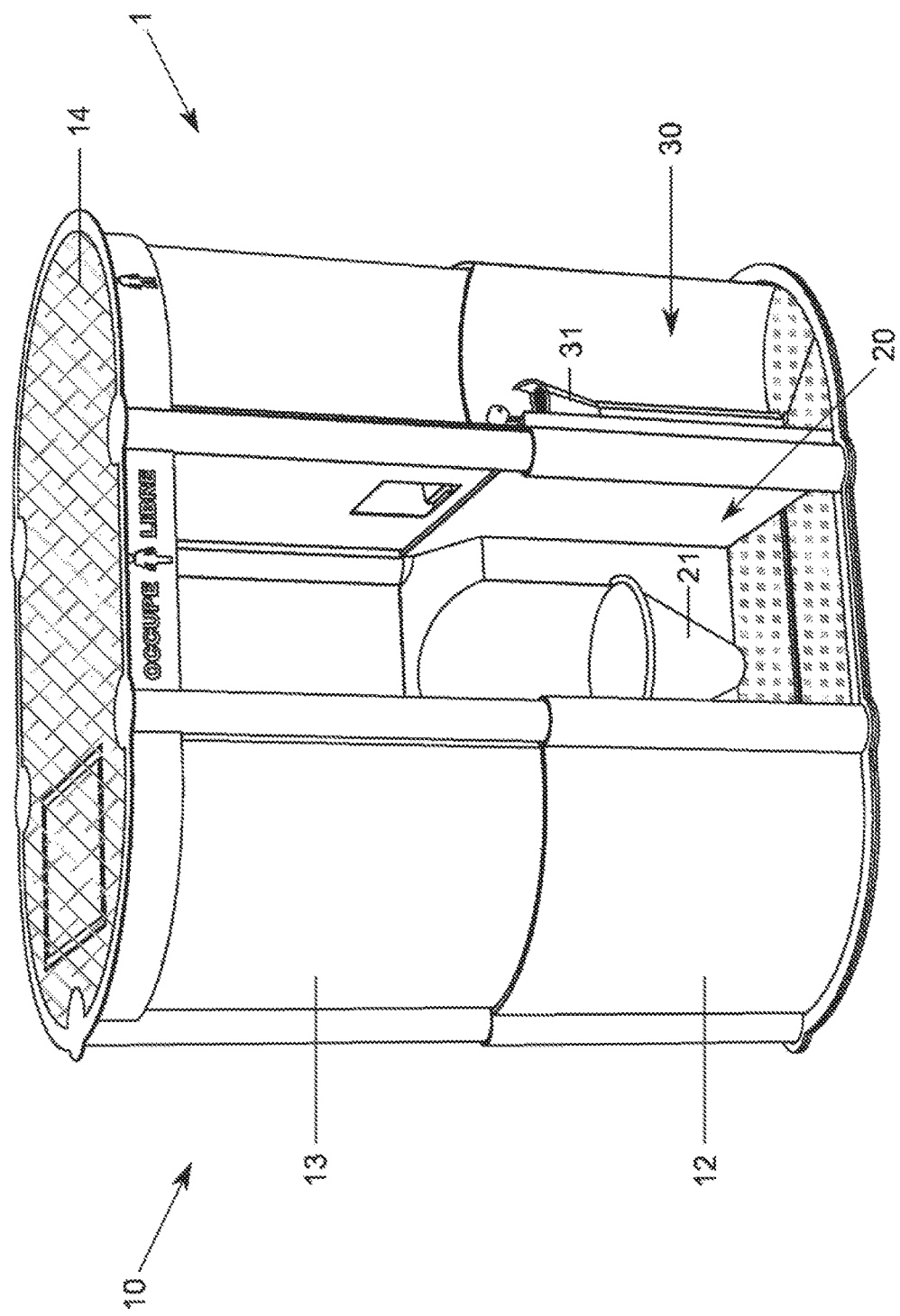

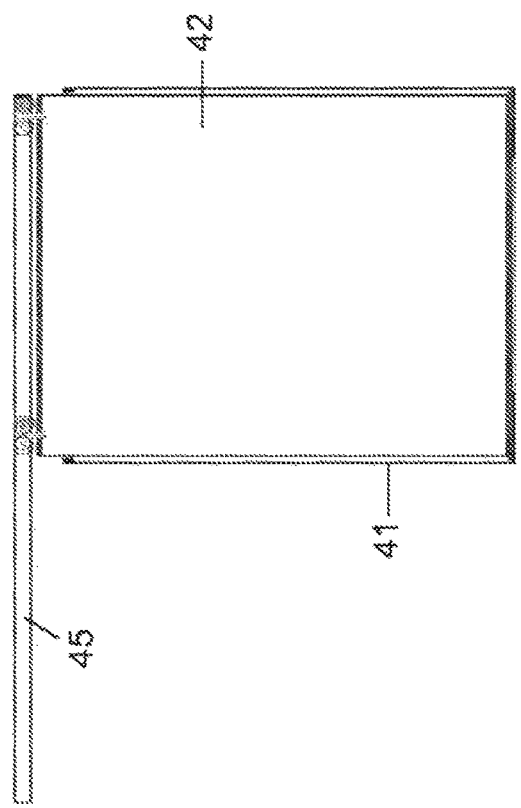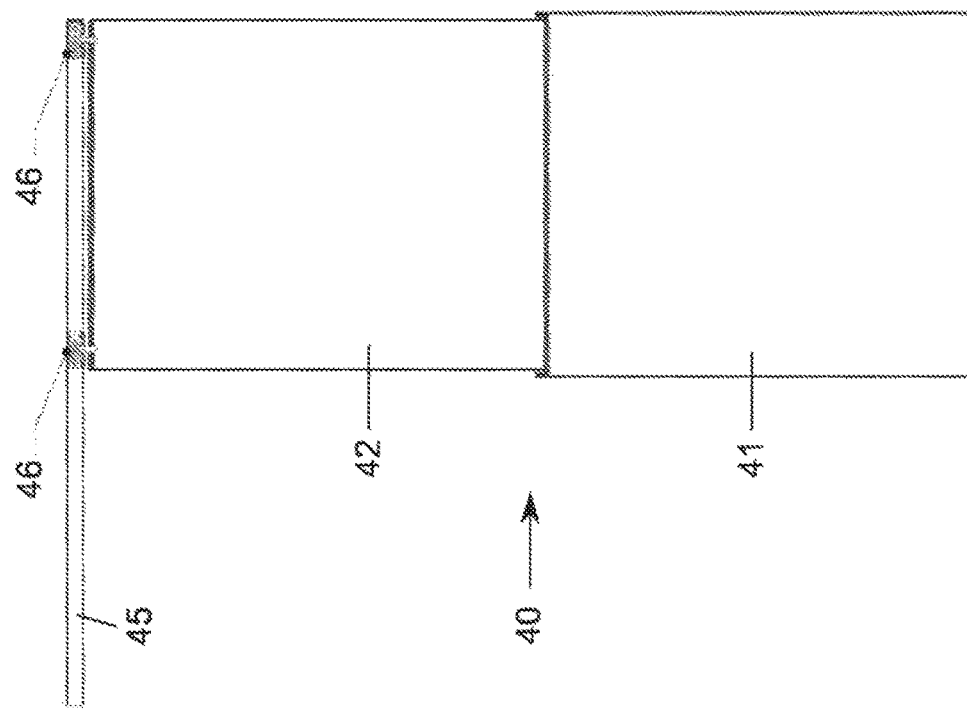

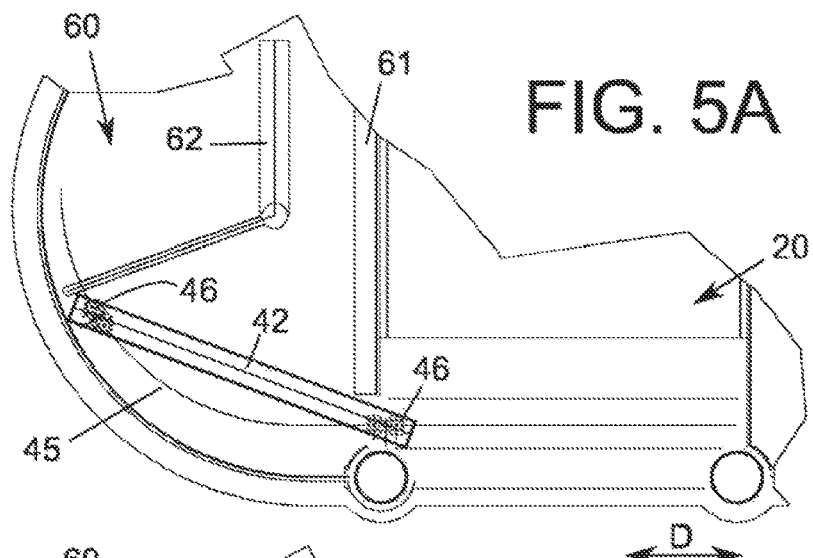
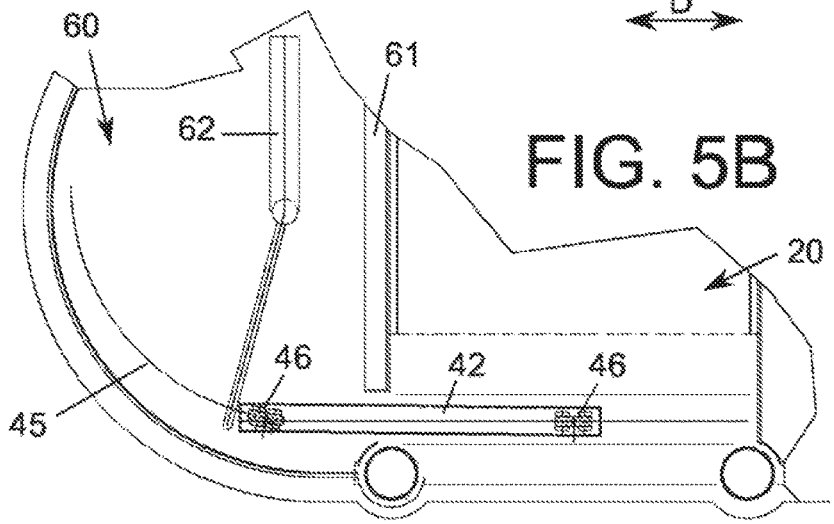
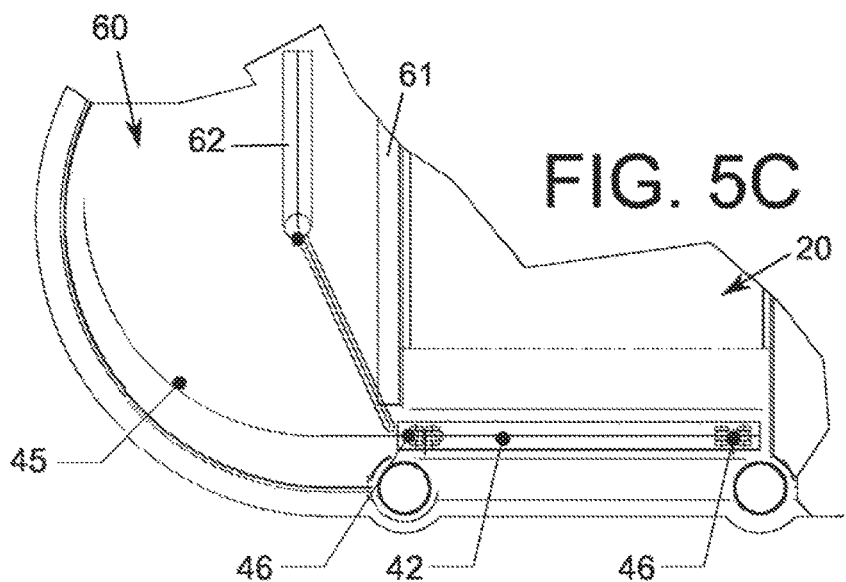

SUBMERGIBLE PUBLIC SANITARY DEVICE HAVING AT LEAST ONE CLOSABLE WALK-IN POSITION

The invention relates to a public sanitary device, comprising a housing with one or more walk-in positions, each with a receptacle for human excrement and/or urine, wherein the housing is provided with a first housing part intended for placing underground, a second housing part received movably in the first housing part and a third housing part received movably in the second housing part, wherein the sanitary device comprises a drive for moving the second and third housing parts between an underground rest position and an above-ground position of use.

Such a public sanitary device is known from the European patent EP 1232313 of the same applicant. The known public sanitary device only has open walk-in positions and is intended for use by men. The part of the housing lying above ground in the position of use comprises two or more housing parts slidable into each other, which give the known public sanitary device a relatively small overall depth.

Applicant also markets a women's version, which is provided with one walk-in position with a door for closing the walk-in position. The women's version has only one housing part which is located above ground in the position of use and which is slidable in its entirety from and to the underground rest position. The closable public sanitary device has a greater overall depth than the non-closable public sanitary device.

The present invention has for its object to provide a public sanitary device of the type stated in the preamble, wherein at least one of the walk-in positions is provided with a door for closing the walk-in position. Closable walk-in positions make the public sanitary device universally applicable for women and men and the disabled.

The public sanitary device according to the invention further has the feature for this purpose that the door comprises at least a first and a second door segment, which door segments are movable in longitudinal direction relative to each other, wherein the second housing part comprises the first door segment and wherein the third housing part comprises the second door segment.

The public sanitary device according to the invention is provided with an above-ground part formed by two or more housing parts movable in longitudinal direction relative to each other and each provided with a door segment. The public sanitary device according to the invention has a low overall depth and can be installed underground at many locations. The two movable door segments together form a reliable door construction which is vandal-proof and suitable for public spaces.

In a first preferred embodiment of the public sanitary device according to the invention the second door segment is received slidably in the first door segment. The first door segment takes an at least partially hollow form for this purpose. A hollow door segment is stronger because of the double walls and results in a better weight distribution. The reliable operation and the vandal-proof character of the door construction are optimized in this embodiment.

According to a practical development of the first preferred embodiment, the second door segment is provided on the underside with a widened base and the first door segment is provided on the upper side with a narrowed longitudinal opening in which the base is received. During extending the second door segment automatically carries the first door segment to the position of use. The base moreover forms a further strengthening of the door construction at the position of the centre. The base contributes toward the desired centering of the door segments. Undesirable damage can hereby be avoided.

In a practical preferred embodiment the door is movable in the position of use in transverse direction of the housing between an open position and a closed position, wherein in the open position the door is received at least partially in the housing. The door is embodied as sliding door and forms no obstruction to the user, nor to passers-by in public spaces. The choice for a sliding door results in space-saving and makes a compact design possible.

According to a further development of this practical preferred embodiment, the housing further comprises an at least partially closed space for receiving the door in the open position. In a further development the door is mounted in a rail extending along an inner surface of the housing.

The door preferably has a substantially straight surface and thereby takes an extra-strong form. The surface of the housing is preferably at least partially curved, this resulting in a compact and aesthetic design.

According to a universal embodiment, the housing comprises one or more further housing parts which are received movably in the third housing part, and the number of door segments corresponds to the number of housing parts situated above ground in the position of use.

In a combined version of the public sanitary device according to the invention the housing comprises two or more walk-in positions, wherein at least one of the walk-in positions is provided with the door and at least one of the walk-in positions is not provided with the door. The sanitary device preferably has three walk-in positions. The combined version can comprise any combination of sanitary devices for men, women and/or the disabled.

In another preferred embodiment the housing comprises a drive with one or more, preferably three, rods, each comprising a number of parts slidable into each other. Such a drive preferably engages on the housing at multiple points and guarantees the stability of the sanitary device in all positions.

In a highly compact embodiment the movable housing parts are telescopically slidable into each other. The rods are hydraulic cylinders, preferably telescopic cylinders.

The invention will now be described in more detail with reference to the figures.

FIG. 1A shows a schematic view of a preferred embodiment of the public sanitary device according to the invention in position of use;

FIGS. 3A and 3B show the door of FIGS. 2A and 2B in schematic front view in respectively position of use and rest position;

FIGS. 5A-5C show a partially cut-away top view of the preferred embodiment of FIG. 1A with the door in different positions: open, half-open and closed.

FIGS. 1A and 1B show schematically a preferred embodiment of a public sanitary device 1 according to the invention in position of use.

Figure 1B:
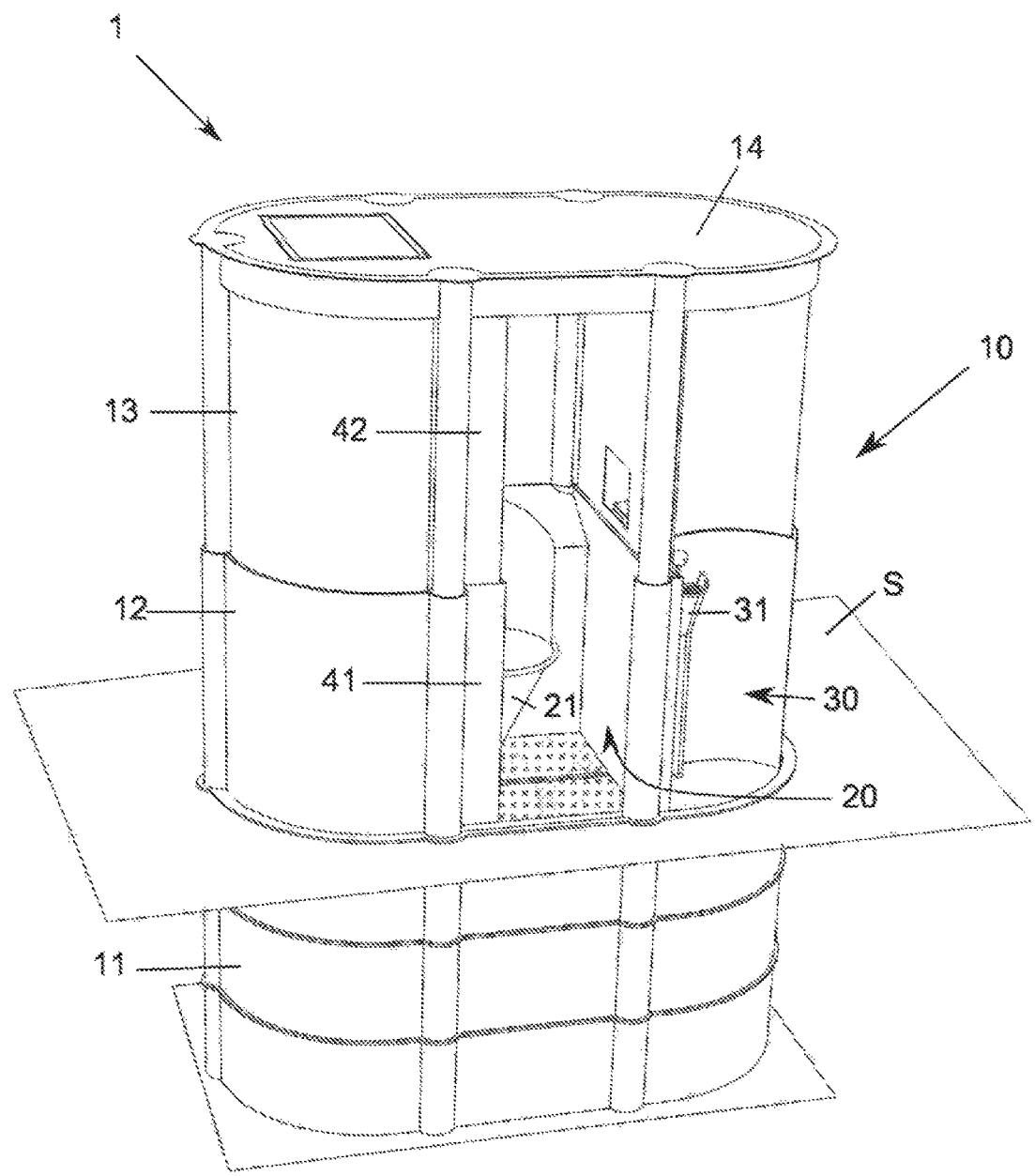
FIG. 1B shows the preferred embodiment of FIG. 1A with both above-ground and underground housing parts.

Housing 10 comprises a first housing part 11 intended for placing underground, a second housing part 12 received slidably in first housing part 11, and a third housing part 13 received slidably in second housing part 12. Second housing part 12 and third housing part 13 are slidable between an underground rest position and an above-ground position of use. FIG. 1A shows only the visible above-ground housing parts. FIG. 1B additionally also shows the underground housing part.

In the position of use walk-in positions 20, 30 of housing 10 are accessible for use. In the underground rest position only the upper side is visible. The upper side is formed by cover 14, which can be integrated into street surface S.

Housing 10 of public sanitary device 1 is provided with means for at least partial submerging thereof into the ground. The means comprise a drive for sliding the movable housing parts between the rest position and the position of use.

Public sanitary device 1 is intended for stationary placement. The receptacles are connected for this purpose to a waste pipe (not shown) for connection to an existing sewage system.

The housing is provided with one or more walk-in positions 20, 30. Walk-in position 20 is provided in the preferred embodiment with a receptacle 21 for human excrement and/or urine. In the shown preferred embodiment receptacle 21 is a toilet bowl. Walk-in position 30 is provided in the shown preferred embodiment with a receptacle 31 for urine. In the shown preferred embodiment receptacle 31 is a urinal.

According to the invention at least one of the two or more walk-in positions is provided with a door for closing the walk-in position. Walk-in position 20 is provided with a door 40 for closing the walk-in position. This makes walk-in position 20 suitable for use by persons who want to take up a sitting position relative to receptacle 21 and will have to partially undress for this purpose. The public sanitary device 1 according to the invention is hereby suitable for use by both men and women.

Figure 2A:
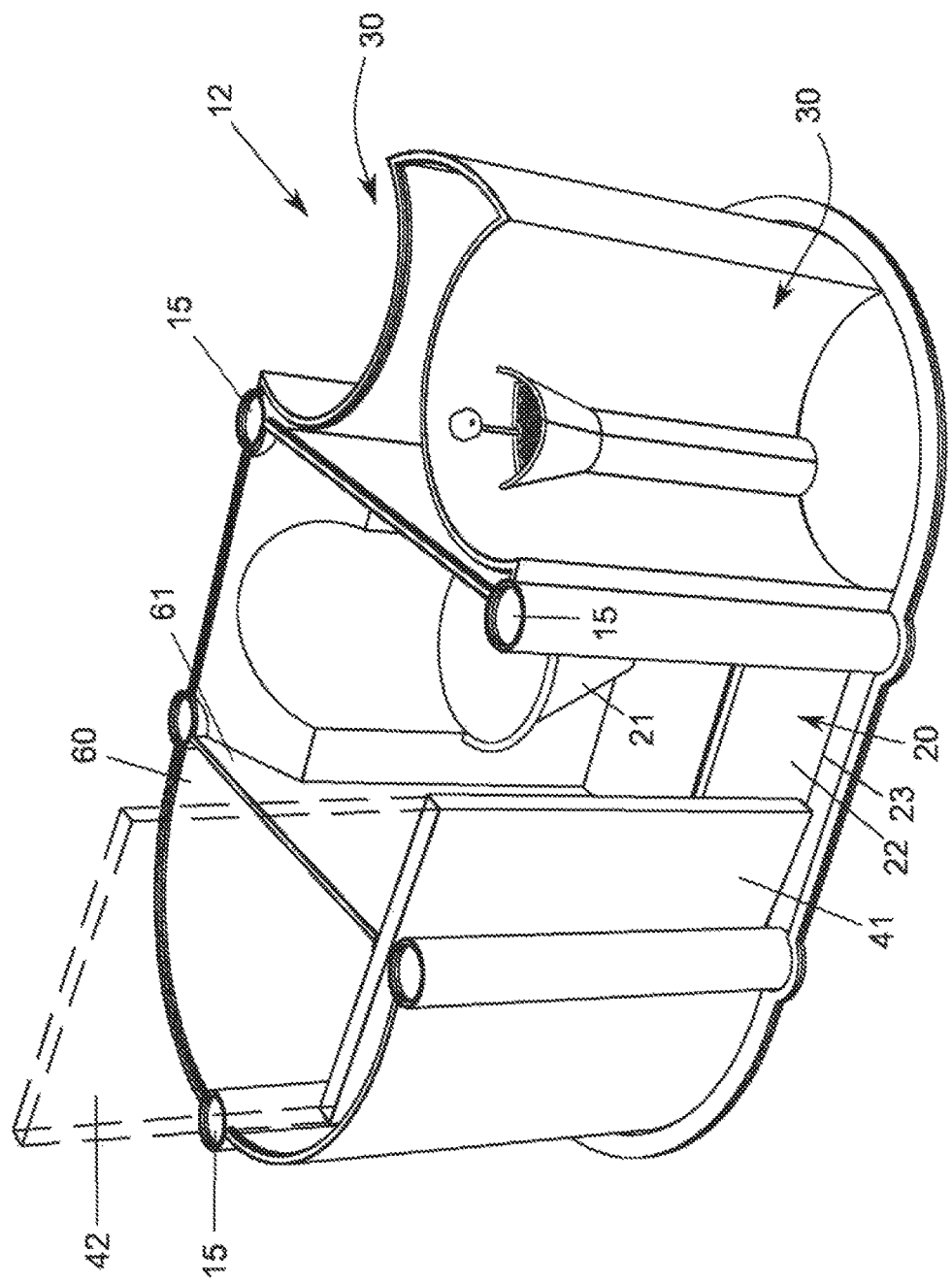
FIG. 2A shows a second housing part of the preferred embodiment of FIGS. 1A and 1B with a half-opened door.
Figure 2B:
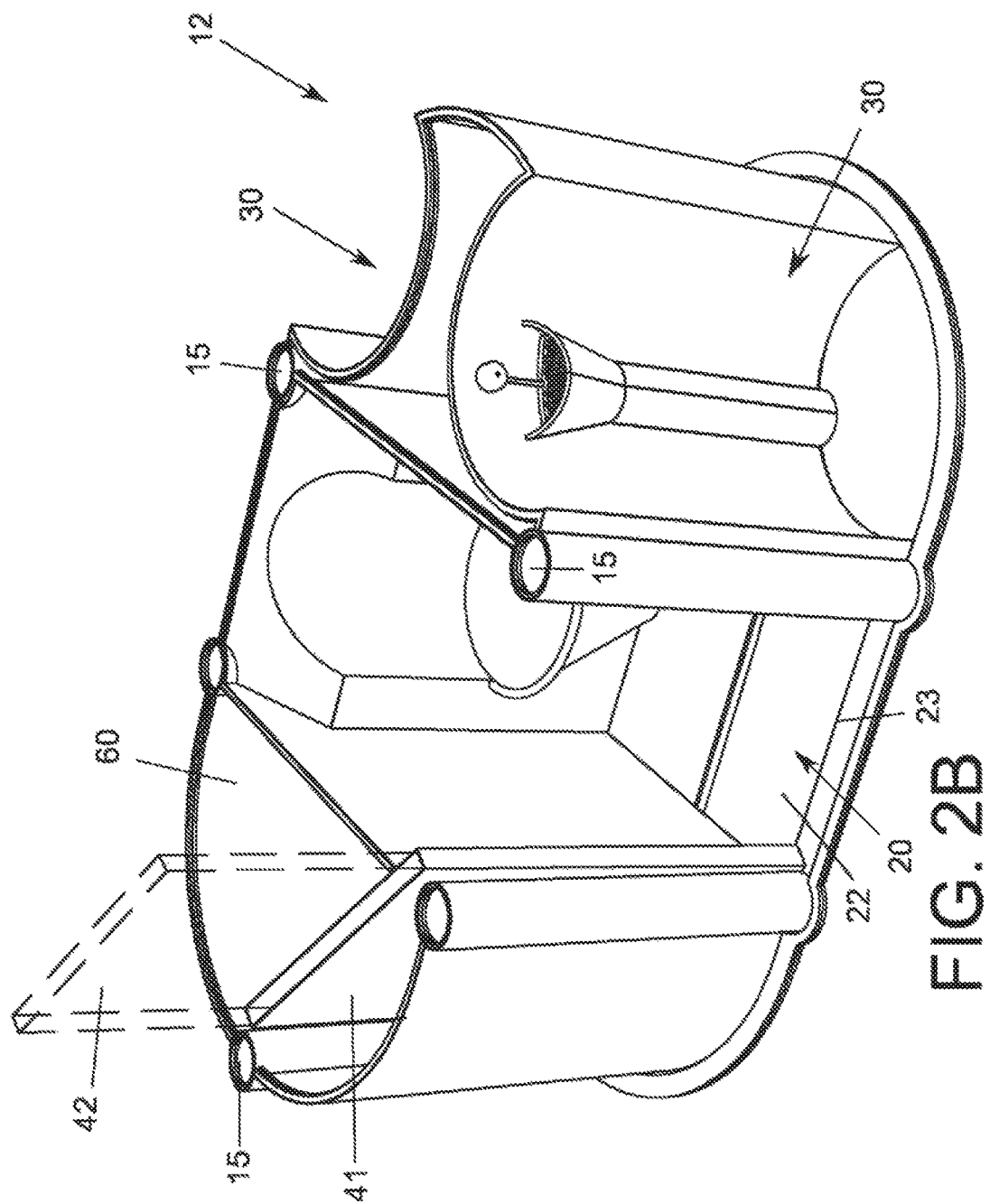
FIG. 2B shows the second housing part of FIG. 2A with fully opened door.

FIGS. 2A and 2B illustrate the operation of door 40 for closing walk-in position 20. FIG. 2A shows only the second housing part 12 with door 40 in a half-open position. FIG. 2B shows second housing part 12 with door 40 in wholly open position. Door 40 comprises at least two segments 41, 42 slidable relative to each other. First door segment 41 is arranged in second housing part 12. Second door segment 42 is shown with broken lines and is arranged in third housing part 13. Door segments 41, 42 are partially shown in FIG. 1B for the sake of clarity.

Figures 4A, 4B:
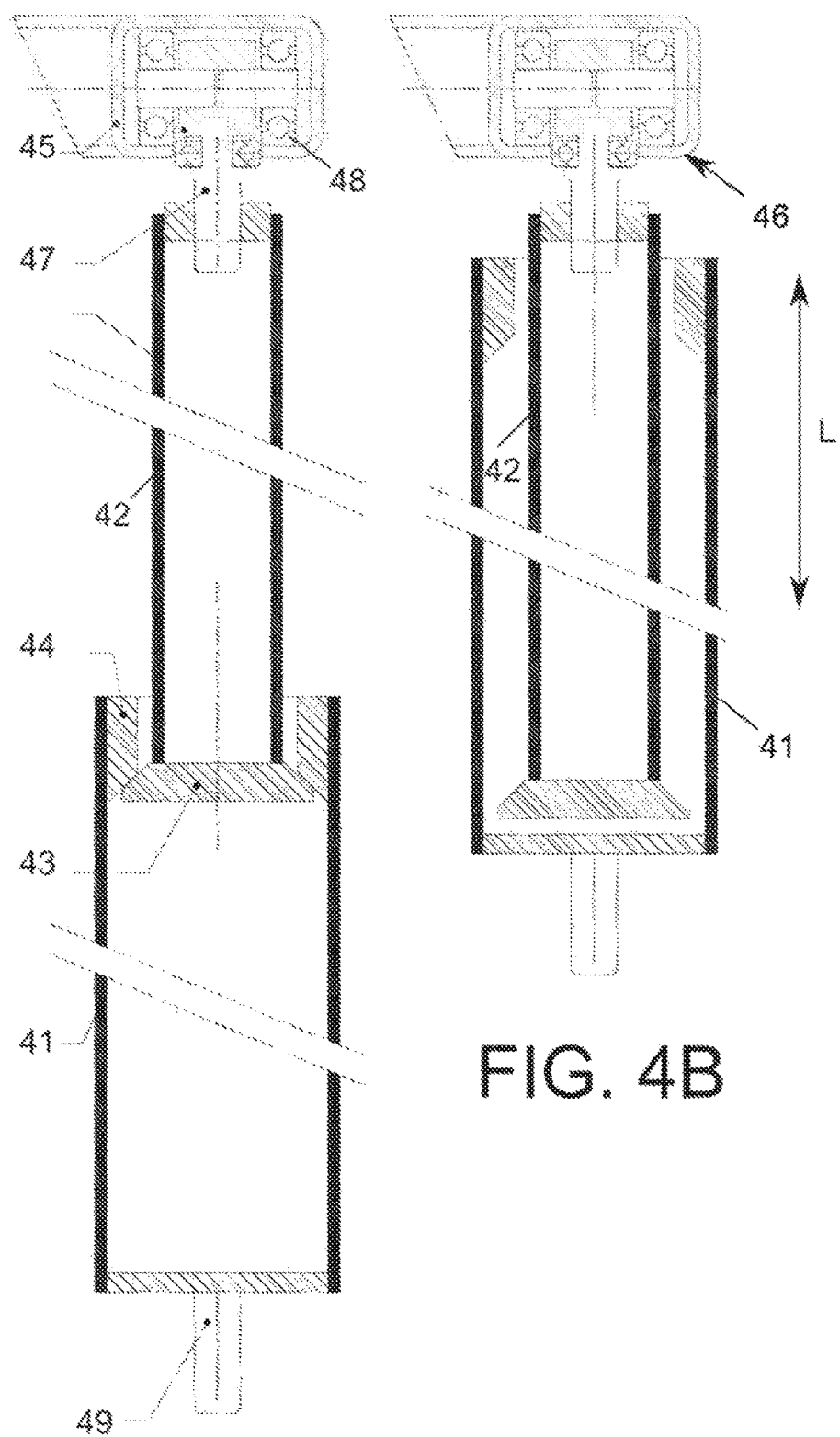
FIGS. 4A and 4B show the door in the positions of respective FIGS. 3A and 3B in cut-away cross-sectional view.

In the shown preferred embodiment the second door segment 42 is received slidably in first door segment 41. FIGS. 3A and 3B show by way of illustration a schematic front view of door 40 in respectively extended and retracted position. FIGS. 4A and 4B show door 40 in the same positions as in FIGS. 3A and 3B, but now in cut-way cross-sectional view. When moving from the rest position to the position of use, and vice versa, the door segments slide together with the housing parts in longitudinal direction L. Second door segment 42 is provided on the underside with a widened base 43 which is received in a narrowed longitudinal opening of first door segment 41, which takes a hollow form for this purpose. The narrowing in the longitudinal opening is obtained by placing one or more shoulders 44, which function as stop for base 43. FIG. 4A illustrates base 43 resting against stops 44 in the position of use.

The upper door segment, in the shown preferred embodiment the second door segment 42, is mounted in a rail 45 extending along an inner surface of housing 10. In the shown preferred embodiment rail 45 extends over the ceiling of third housing part 13. Rail 45 can be arranged integrated into cover 14. The rail is illustrated in FIGS. 5A-5C, wherein a part of housing part 13 is shown schematically in cut-away top view.

Door 40, in this case upper door segment 42, is mounted by means of a number of suspension points 46 in rail 45. Each suspension point comprises a runner 47 which is mounted on the upper side of second door segment 42 and is provided with guide elements 48 for guiding in rail 45. Each lower, in this preferred embodiment each first, door segment 41 is provided on the underside with a guide member 49 for guiding in a rail 23 which extends over bottom 22 of walk-in position 20.

In the position of use of public sanitary device 1 door 40 is movable in transverse direction D of housing 10 between an open position and a closed position. Door 40 is therefore embodied as sliding door.

In the shown preferred embodiment all door segments take a hollow form. This is however only important for lower door segment 41, and not essential for door segment 42 and further door segments. In the shown preferred embodiment the number of door segments is two. This corresponds to the number of housing parts 12, 13 located above ground in position of use. The number of door segments will generally correspond to the number of housing parts located above ground in position of use. The housing can comprise more than two above-ground housing parts. The housing can also comprise a plurality of walk-in positions, wherein the walk-in positions can be provided as desired with a door according to the invention. In the shown preferred embodiment only one of the walk-in positions 20 is provided with door 40, and two other walk-in positions 30 are not provided with a door.

In the shown preferred embodiment the surface of housing 10 is at least partially curved. The surface of door 40 is however preferably substantially straight.

Housing 10 further comprises an at least partially closed space 60 for receiving the door in the open position. In the shown preferred embodiment space 60 is separated from walk-in position 20 by means of a wall 61. This wall 61 leaves clear a space for movement of door 40. Wall 61 is optional. Omitting wall 61 makes walk-in position 20 more spacious and enables it to be configured as a disabled toilet. Sliding of door 40 in transverse direction D can take place both manually and automatically or semi-automatically. The shown preferred embodiment shows a door closer 62 for closing the door 40.

Public sanitary device 1 according to the invention comprises a drive for moving the slidable housing parts 12, 13. The drive comprises one or more rods, preferably three. Housing 10 is provided with receiving spaces 15 for receiving the rods. The rods are preferably hydraulic cylinders. Suitable hydraulic cylinders are telescopic cylinders, which each comprise a number of parts or stages slidable into each other. The cylinders preferably take a form with dual control, wherein each of the stages is provided with its own control for movement from the rest position to the position of use. Each hydraulic cylinder is preferably also configured to move from the position of use to the rest position under the influence of its own weight. Suitable hydraulic cylinders are single-action cylinders. An equal stroke of the co-acting rods is important for an accurate operation of the drive.

The invention is of course not limited to the described and shown preferred embodiment. The door segments can for instance be embodied so as to be movable in other manner, for instance as door segments slidable alongside each other. None of the door segments need then be hollow. The door can in addition consist of a plurality of parts slidable in transverse direction. The door need not however be embodied as sliding door, but can for instance also be a hinged door mounted pivotally on the housing. The housing parts preferably take a telescopically slidable form, although this is not essential. An underground pit can further form an alternative to the first underground housing part. The drive can also be realized in other manner, for instance by means of a spindle.

The invention therefore extends to any embodiment falling within the scope of protection as defined in the claims and as seen in the light of the foregoing description and accompanying drawings.

The invention claimed is:

1. A public sanitary device, comprising:
a housing with one or more walk-in positions, each with a receptacle for human excrement and/or urine, wherein the housing comprises:
a first housing part intended for placing underground,
a second housing part received movably in the first housing part, and
a third housing part received movably in the second housing part,
wherein the sanitary device comprises a drive for moving the second and third housing parts between an underground rest position and an above-ground position of use, characterized in that at least one of the walk-in positions is provided with a door for closing the walk-in position and that the door comprises a first and a second door segment, which door segments are movable in longitudinal direction relative to each other, wherein the second door segment is received slidably in the first door segment, wherein the second housing part comprises the first door segment and wherein the third housing part comprises the second door segment, wherein the second door segment is provided on the underside with a widened base and wherein the first door segment takes a hollow form and is provided on the upper side with a narrowed longitudinal opening in which the base is received, wherein the door is movable in the position of use in transverse direction of the housing between an open position and a closed position, wherein in the open position the door is received at least partially in the housing, wherein the second door segment is mounted on to a rail extending along an inner surface of the third housing part and wherein the first door segment is mounted on to a rail extending over the bottom of the second housing part.

2. The public sanitary device as claimed in claim 1, wherein the housing further comprises an at least partially closed space for receiving the door in the open position.

3. The public sanitary device as claimed in claim 1, wherein the door has a substantially straight surface.

4. The public sanitary device as claimed in claim 1, wherein the housing has an at least partially curved surface.

5. The public sanitary device as claimed in claim 1, wherein the housing comprises two or more walk-in positions, wherein at least one of the walk-in positions is provided with the door and at least one of the walk-in positions is not provided with the door.

6. The public sanitary device as claimed in claim 1, wherein the drive comprises one or more, rods, each comprising a number of parts slidable into each other.

7. The public sanitary device as claimed in claim 6, wherein the one or more rods are hydraulic cylinders, preferably telescopic cylinders.

8. The public sanitary device as claimed in claim 1, wherein the first movable housing part, the second movable housing part, and the third movable housing part are telescopically slidable into each other.

9. The public sanitary device as claimed in claim 1, wherein the one or more receptacle are arranged in the second housing part.

10. A public sanitary device, comprising a housing with one or more walk-in positions, each with a receptacle for human excrement and/or urine, wherein the housing comprises:
a first housing part intended for placing underground,
a second housing part received movably in the first housing part, and
a third housing part received movably in the second housing part,
wherein the sanitary device comprises a drive for moving the second and third housing parts between an underground rest position and an above-ground position of use, characterized in that at least one of the walk-in positions is provided with a door for closing the walk-in position and that the door comprises a first and a second door segment, which door segments are movable in longitudinal direction relative to each other, wherein the second housing part comprises the first door segment and wherein the third housing part comprises the second door segment, wherein the housing comprises two or more walk-in positions, wherein at least one of the walk-in positions is provided with the door and at least one of the walk-in positions is not provided with the door, wherein the door is movable in the position of use in transverse direction of the housing between an open position and a closed position, wherein in the open position the door is received at least partially in the housing, wherein the second door segment is mounted on to a rail extending along an inner surface of the third housing part and wherein the first door segment is mounted on to a rail extending over the bottom of the second housing part.

11. A public sanitary device as claimed in claim 10, wherein the second door segment is received slidably in the first door segment.

12. The public sanitary device as claimed in claim 10, wherein the second door segment is provided on the underside with a widened base and wherein the first door segment takes a hollow form and is provided on the upper side with a narrowed longitudinal opening in which the base is received.

13. The public sanitary device as claimed in claim 10, wherein the housing further comprises an at least partially closed space for receiving the door in the open position.

14. The public sanitary device as claimed in claim 10, wherein the door has a substantially straight surface.

15. The public sanitary device as claimed in claim 10, wherein the housing has an at least partially curved surface.

16. The public sanitary device as claimed in claim 10, wherein the drive comprises one or more, preferably three, rods, each comprising a number of parts slidable into each other.

17. The public sanitary device as claimed in claim 16, wherein the rods are hydraulic cylinders, preferably telescopic cylinders.

18. The public sanitary device as claimed in claim 10, wherein the movable housing parts are telescopically slidable into each other.

19. The public sanitary device as claimed in claim 10, wherein the one or more receptacles are arranged in the second housing part.

\* \* \* \* \*